Oct. 29, 1935. C. F. RICHARD 2,018,807
PACKAGING MACHINE
Original Filed Dec. 2, 1932 9 Sheets-Sheet 1

Inventor
Charles F. Richard
By Cameron, Kerkam + Sutton
Attorneys

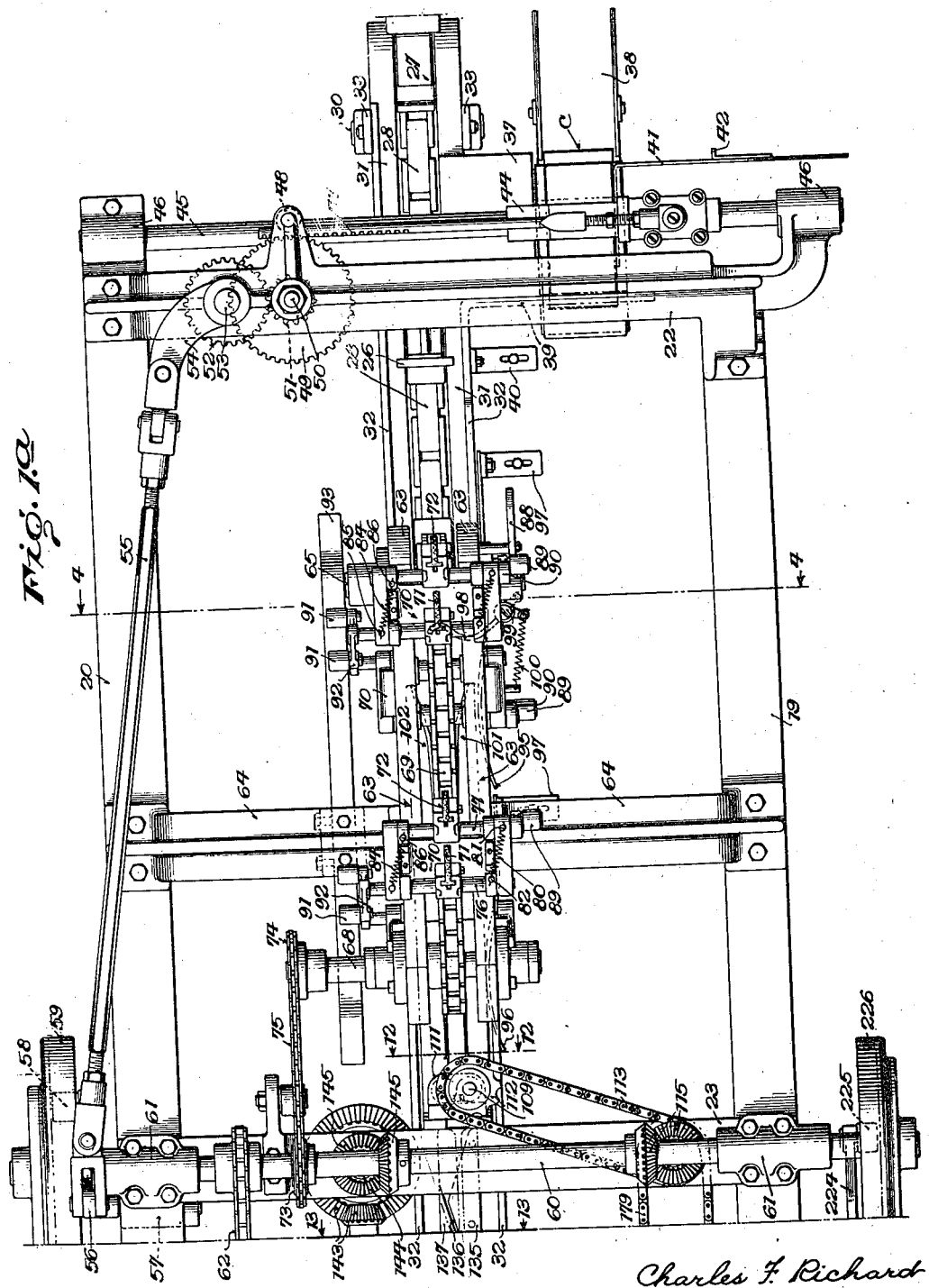

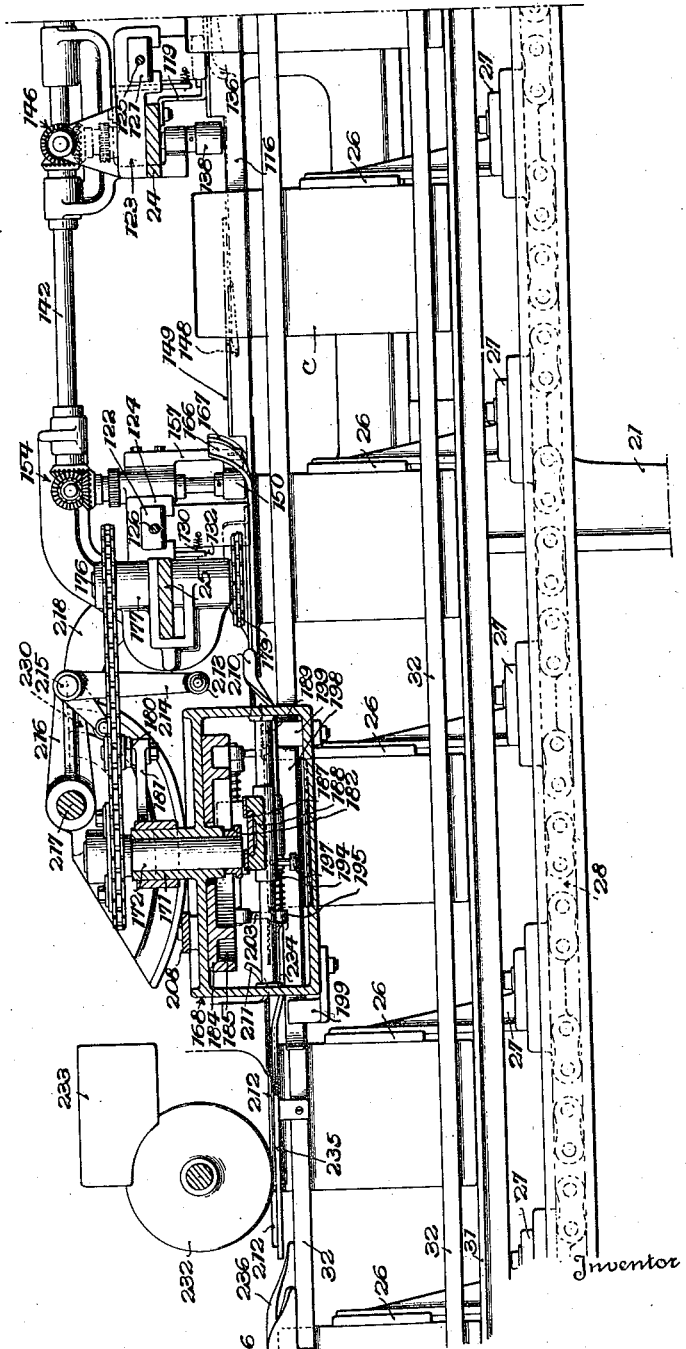

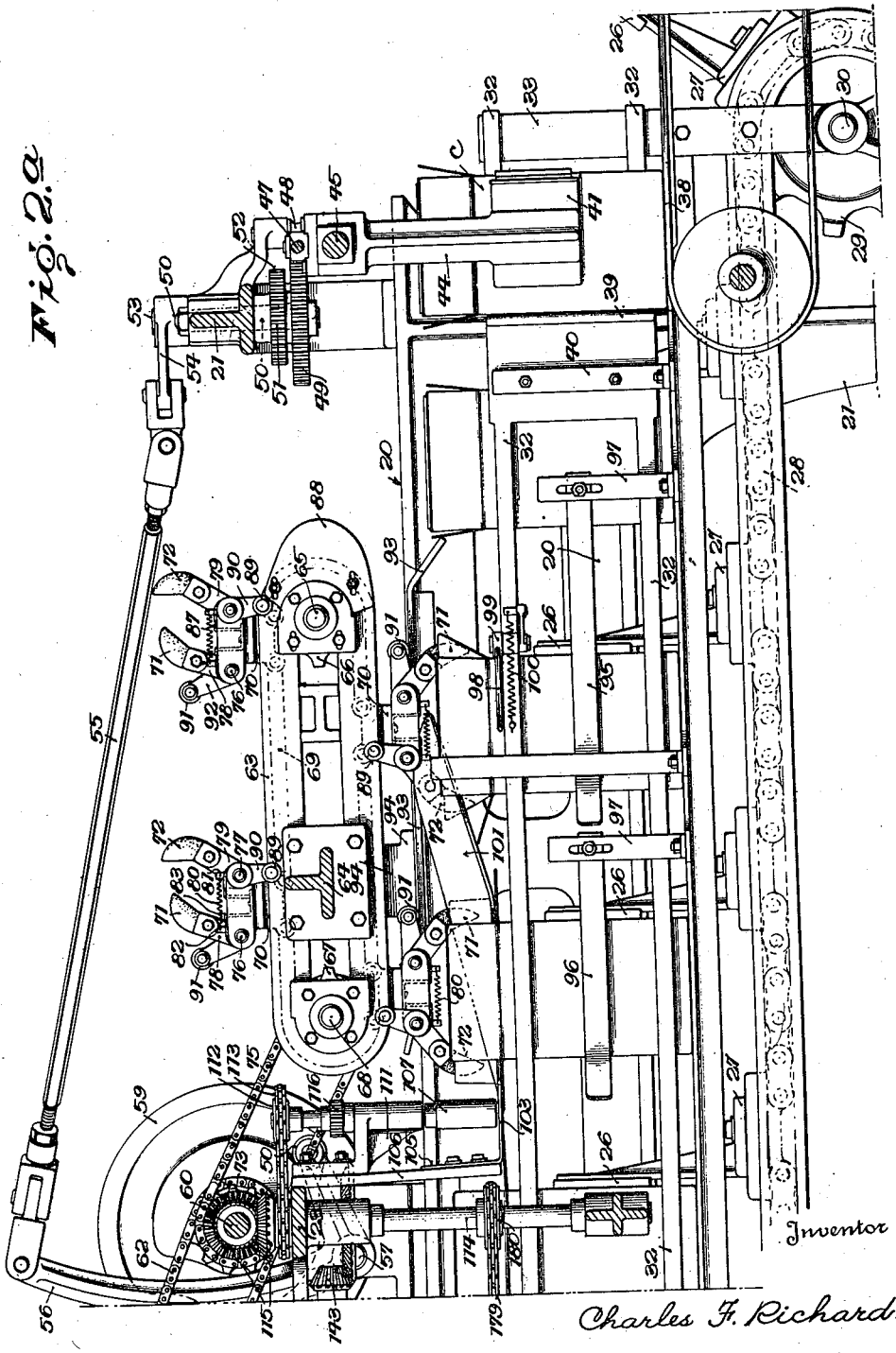

Oct. 29, 1935.  C. F. RICHARD  2,018,807
PACKAGING MACHINE
Original Filed Dec. 2, 1932  9 Sheets-Sheet 5

Inventor
Charles F. Richard
By Cameron, Kerkam & Sutton.
Attorneys

Oct. 29, 1935.　　　C. F. RICHARD　　　2,018,807
PACKAGING MACHINE
Original Filed Dec. 2, 1932　　9 Sheets-Sheet 6
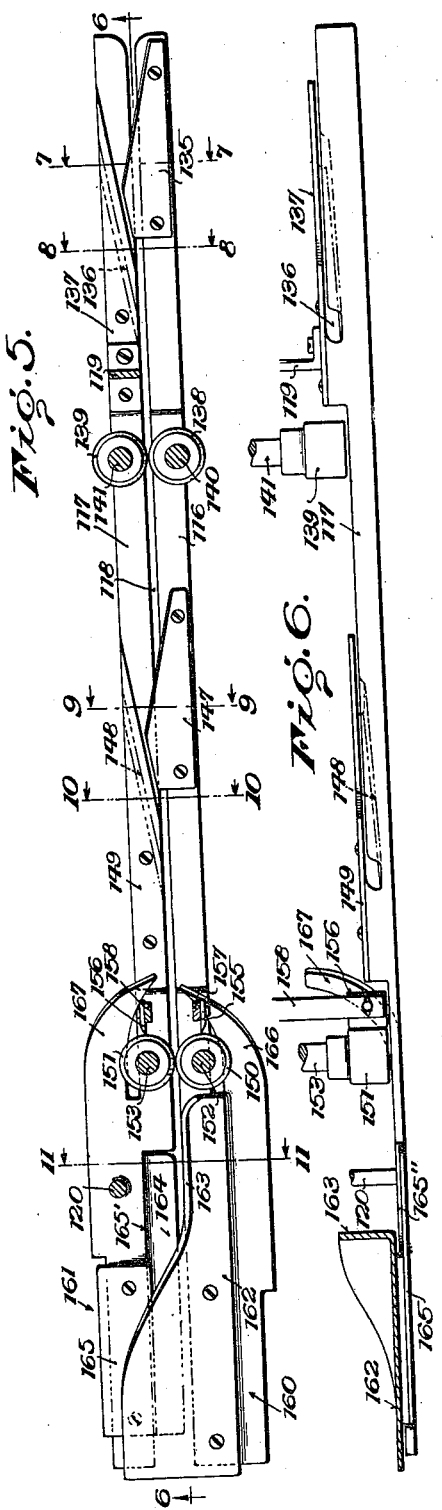
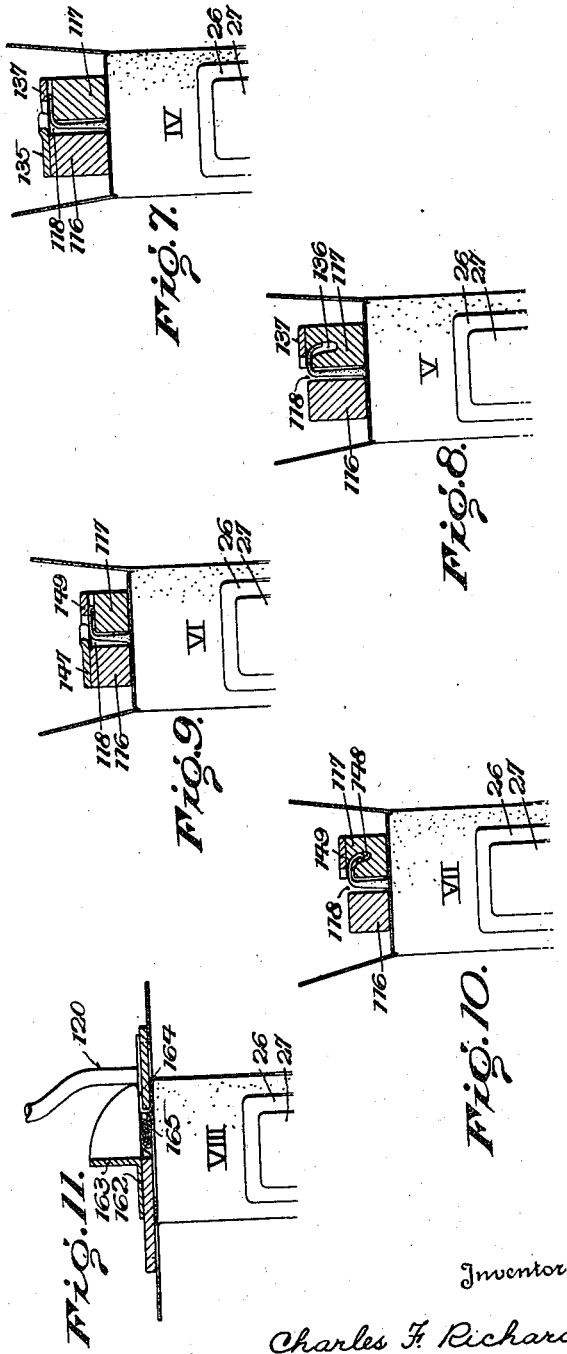
Inventor
Charles F. Richard.
By Cameron, Kerkam & Sutton.
Attorneys

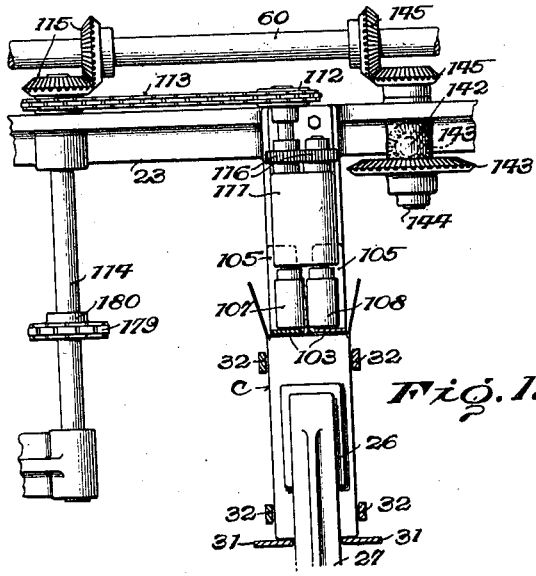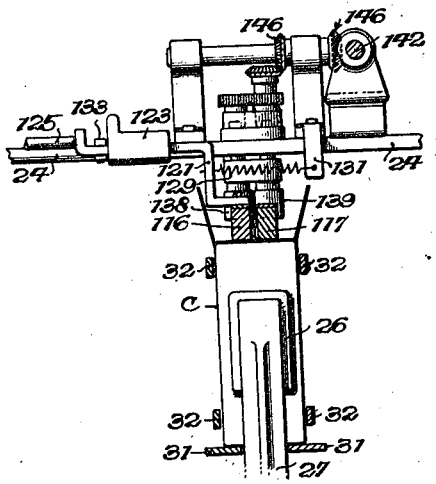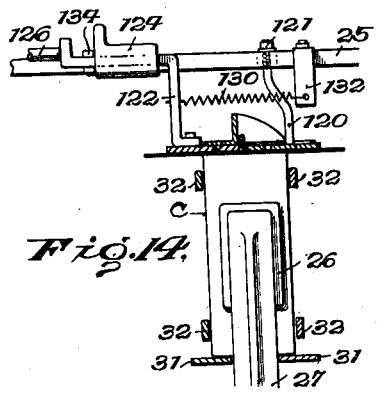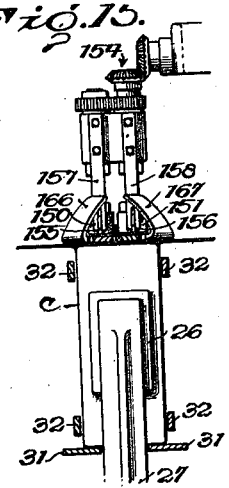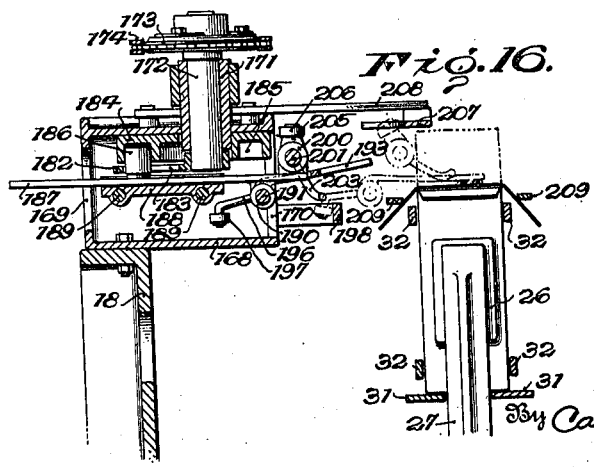

Oct. 29, 1935.   C. F. RICHARD   2,018,807
PACKAGING MACHINE
Original Filed Dec. 2, 1932   9 Sheets-Sheet 8

Inventor
Charles F. Richard
By Cameron, Kerkam & Sutton.
Attorneys

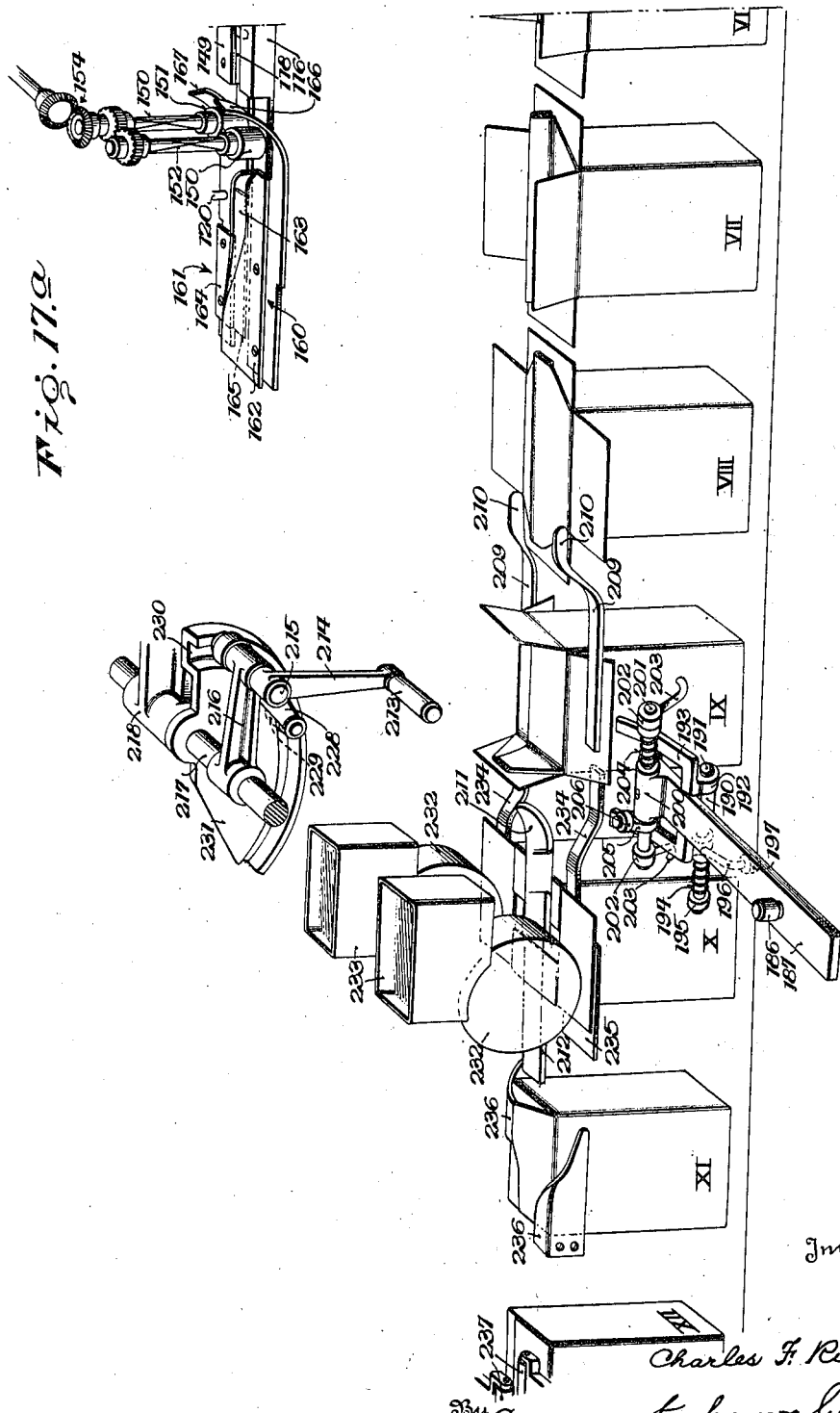

Patented Oct. 29, 1935

2,018,807

UNITED STATES PATENT OFFICE 2,018,807

PACKAGING MACHINE

Charles F. Richard, Battle Creek, Mich., assignor to Johnson Automatic Sealer Co., Ltd., Battle Creek, Mich., a partnership association limited of Michigan Application December 2, 1932, Serial No. 645,481
Renewed January 24, 1935

29 Claims. (Cl. 93—6)

This invention relates to packaging machinery, and more particularly to machines for closing the tops of the liners or bags of lined cartons prior to the closing and sealing of the cartons themselves.

In the handling of cartons having liners formed of wax-impregnated or other self-sealing paper, it has already been suggested that the liners may be effectively closed and sealed by bringing the sides of the open liner tops into intimate contact with one another and simultaneously applying heat thereto so as to melt the wax and cause adhesion of the portions thus brought together. However, machines now in use for effecting a heat seal of this character are not entirely satisfactory in operation because of various functional defects and the increased operating cost due to the use of heat, and are not well adapted for use with cartons in which the liners are made of material other than waxed or self-sealing paper.

It is therefore one of the objects of the present invention to provide new and improved mechanism for rapidly and efficiently, and without the use of heat, closing the tops of the liners or bags of a succession of lined cartons as they pass through a packaging machine.

Another object is to provide a carton sealing machine for cartons having inner bags or liners with novel means for closing and folding the open tops of said bags for liners prior to the closing and sealing of the cartons themselves.

A further object is to provide mechanism of this character wherein the liner tops are first elongated and creased to insure uniform folding, and are then progressively folded by passage through a succession of fixed folders of unique construction so as to effectively close the liners against loss of the material therein, or change in moisture content thereof.

Still another object is to provide novel mechanism of comparatively simple construction for closing and folding the open end of the filled liner of a carton which mechanism is operable without disturbing the positions of the side flaps of the carton.

A still further object is to provide an improved packaging machine through which a carton having a filled inner bag or liner is automatically advanced, the open end of the liner being elongated, creased and folded by a novel arrangement of non-heated elements, and the flaps of the carton itself being closed and sealed, all of said operations taking place successively as the carton is continuously advanced through the machine.

These and other objects, including the provision of novel means for remedying distortion in the shapes of the cartons caused by operation of the liner elongating mechanism, will appear more fully from a consideration of the detailed description of the invention which follows. Although only one embodiment of the invention has been described and illustrated in the accompanying drawings, it is to be expressly understood that these drawings are for the purpose of illustration only and are not to be construed as defining the scope of the invention, reference being had for this purpose to the appended claims.

In the drawings, wherein like reference characters indicate like parts throughout the several views:

Figs. 1 and 1a, when joined along the broken lines, constitute a plan view, partially diagrammatic, of a packaging machine forming one embodiment of the present invention;

Figs. 2 and 2a, when joined along the broken lines, constitute a side elevation, with the near side frame cut away and certain parts shown in section, of the machine disclosed in Figs. 1 and 1a;

Fig. 4 is a sectional view taken substantially on the line 4—4 of Fig. 1a;

Fig. 5 is a plan view on an enlarged scale of the fixed folder and creasing roll mechanism, with certain parts omitted for the sake of clarity;

Fig. 6 is a side elevation of the right-hand (as viewed from the right of Fig. 5) half of the fixed folder mechanism shown in Fig. 5;

Figure 1:
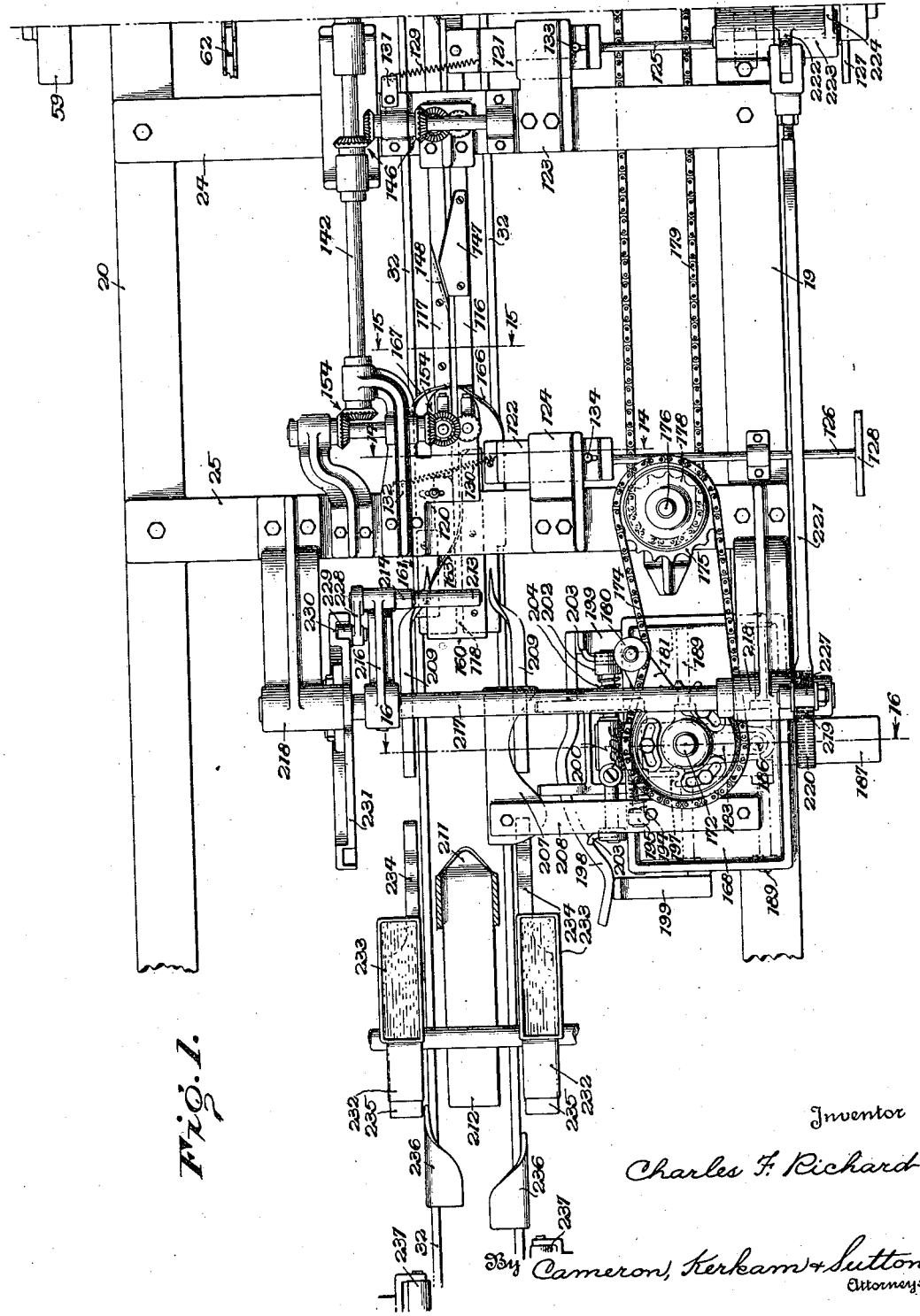
Figure 17:
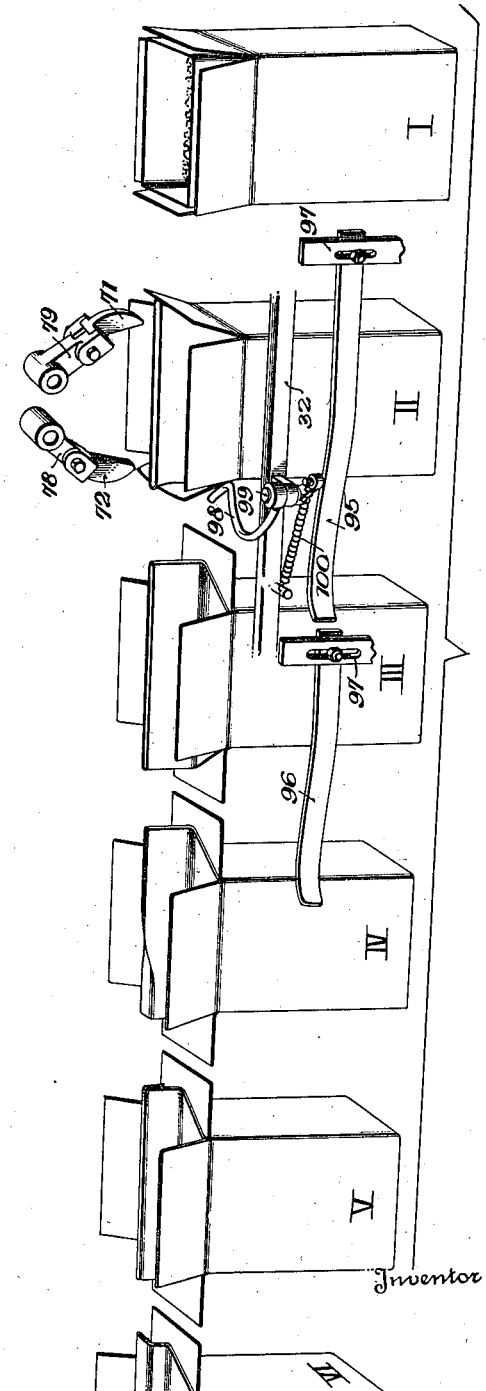

Figs. 7, 8, 9, 10 and 11 are sectional views through the fixed folders taken substantially on lines 7—7, 8—8, 9—9, 10—10 and 11—11, respectively, of Fig. 5;

Fig. 12 is a sectional view taken substantially on line 12—12 of Fig. 1a showing the first set of liner creasing rolls;

Fig. 13 is a sectional view taken substantially on line 13—13 of Fig. 1a showing the second set of creasing rolls;

Fig. 14 is a sectional view through the last set of fixed or flattening folders taken substantially on line 14—14 of Fig. 1;

Fig. 15 is a sectional view taken substantially on line 15—15 of Fig. 1 showing the carton side flap spreading means and the third set of creasing rolls;

Fig. 16 is a sectional view through the mechanism for striking up the end flaps of the carton taken substantially on line 16—16 of Fig. 1; and Figs. 17 and 17a, when joined along the broken lines, constitute a diagrammatical representation in perspective of the various flap and liner spreading, liner folding and creasing, and flap folding means of the present invention, including a representation of the condition of the carton and liner top at substantially each step during its progress through the machine.

Referring now to the drawings, there is disclosed therein a novel machine for closing and folding the tops of the liners or inner bags of lined cartons without the use of heat, and for folding in and sealing the flaps of the tops of said cartons themselves subsequent to the liner closing and folding operations. In this machine, cartons containing open topped, filled liners are supplied to the receiving end thereof from any suitable source, such as a filling and weighing machine, by means of a suitable conveyor. From the conveyor the open cartons are transferred by suitable pusher means to a carrier mechanism traversing the length of the liner closing and folding machine, which mechanism may, if desired, constitute an extension of the carrier mechanism of any of the well known carton top sealing machines. The package is carried forward by said carrier mechanism first beneath a liner spreading and elongating mechanism which spreads the liner top longitudinally, or in the direction of movement of the carrier means, and which also travels with the carton for a predetermined distance while the sides of the elongated liner top are straightened to substantially vertical position and the front and rear carton flaps are moved outwardly and downwardly to substantially horizontal positions by a pair of fixed guide members lying entirely inside of the lines of travel of the vertical carton side flaps. These guide members serve to so shape the elongated liner top as to form a vertically upstanding portion with opposite faces close together and a pair of substantially flat horizontal portions, one on each side of the vertical portion and lying substantially in the plane of the score lines of the carton top.

As the carton is advanced further through the machine, the vertical elongated portion of the liner top passes between a pair of creasing rolls of substantially the same height as the upstanding portion of the liner top in which all of the folds are to be made, which rolls press the opposite sides of the liner top into contact and crease the edges so as to provide a uniform article for the fixed folders to operate upon. From the first set of creasing rolls, the closed and creased vertical liner top passes to the first set of fixed folders wherein said top is folded over upon itself through an angle of substantially 180°. Leaving the first set of fixed folders, the once folded top passes between a second pair of creasing or pressing rolls, and then through a second set of fixed folders wherein a second 180° fold is made. Leaving the second set of fixed folders, the folded top is again acted upon by a third set of creasing rolls, and then, after having the carton side flaps spread sufficiently, passes through the last or flattening set of fixed folders which lays the creased and folded liner top down flat on top of the liner with the front and rear ends thereof projecting outwardly and overlying the front and rear carton flaps. During all of these folding and creasing operations, except the final flattening folding, the side flaps of the carton maintain their original vertical positions.

As the carton passes from beneath the last or flattening folder, the front and rear carton flaps are released and the side flaps are engaged by a pair of flap guide members which move said flaps downwardly to a position substantially below the horizontal by the time that the carton reaches the front and rear flap folding mechanism. At this position, a presser or reaction member is moved into engagement with a portion of the flattened and folded liner top between the front and rear carton flaps in order to prevent a lifting of the carton off of the carrier when a pair of curved fingers engage the outer surfaces of the front and rear carton flaps and strike them upwardly to a position above the horizontal such that they can be acted upon by the front and rear flap folding members. These flap folding members may be of the usual type comprising a fixed shoe with an upwardly curved end to engage the front flap and move it inwardly and downwardly on top of the flattened and folded liner top, carrying with it the overlying projecting end of said liner top, and a movable finger to engage the rear flap and kick it forward to such position that it too may be engaged by the shoe. The carton then passes to an adhesive applying mechanism where flap lifters act to lift the side flaps into contact with suitable glue rolls and glue is applied thereto, after which said side flaps are turned inwardly on top of the inwardly folded front and rear flaps by means well known to the art, and the sealing of the carton is completed.

Referring now more particularly to Figs. 1, 1a, 2 and 2a, the machine embodying the present invention disclosed therein is mounted on and supported by a pair of laterally spaced side frames 19 and 20 of any suitable construction which are supported above the floor or machine foundation by suitable legs 21 and which, if desired, may be formed as the extensions of the side frames of a carton top sealing machine of known construction, such as that disclosed in Patent No. 1,118,424, issued November 24, 1914 to Harry L. Johnson. Side frames 19 and 20 may also be rigidly connected together by suitable crosstie members 22, 23, 24 and 25.

The various component elements of the liner closing and folding mechanism are mounted on and supported by the framework just described, and suitable carrier means are provided in conjunction therewith for moving the lined and filled cartons the length of the machine past the various closing, creasing and folding devices. In the form shown, the carton advancing or carrier means comprises an extension of the carrier of the top sealing machine to which the present machine is connected, and includes a plurality of carton engaging pusher members 26 adjustably secured as by suitable brackets 27 to an endless conveyor chain 28 which passes around a suitable sprocket 29 mounted on a shaft 30 journaled adjacent the forward or receiving end of the liner closing and folding machine, and a similar sprocket (not shown) at the delivery end of the carton top sealing machine. Chain 28 and the pusher members 26 mounted thereon may be continuously driven in any suitable manner as from the main driving shaft of the carton top sealing machine.

Figure 3:
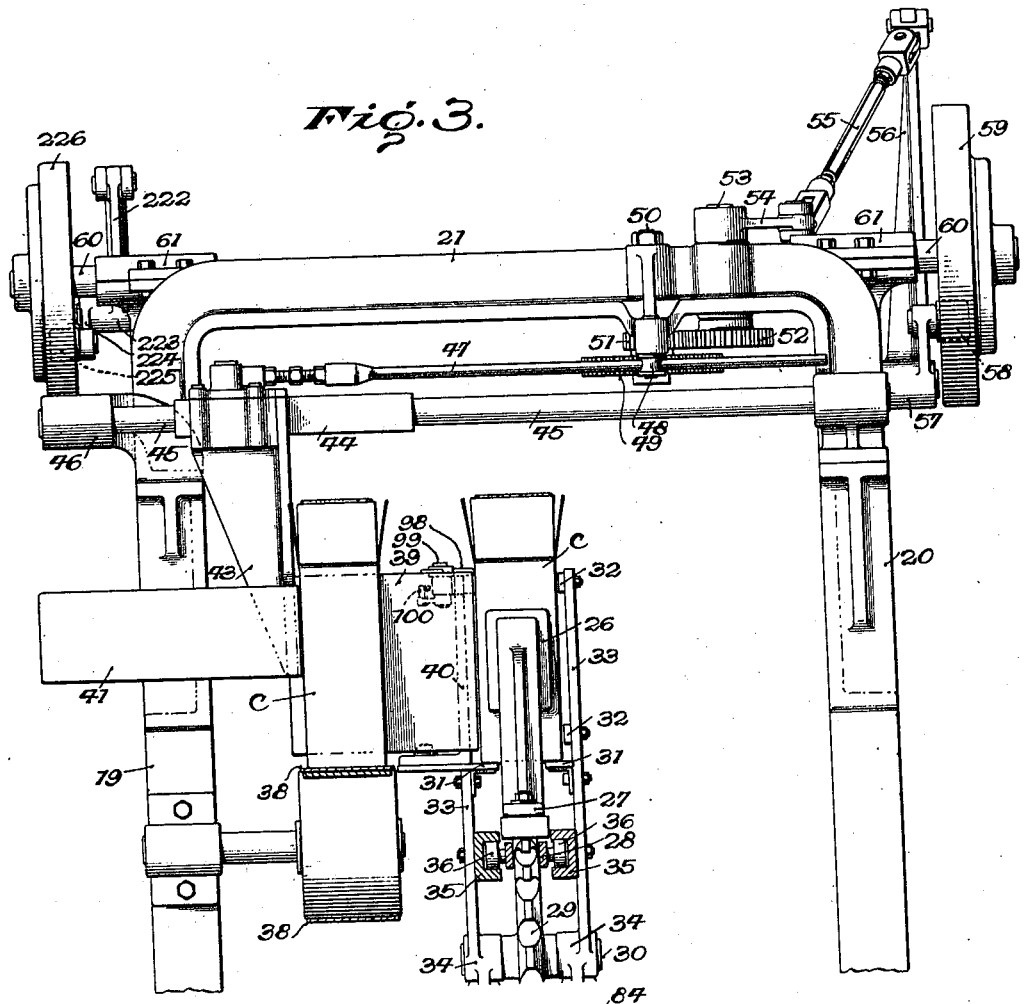
Fig. 3 is an end view, taken from the right of Figs. 1a and 2a, with certain parts omitted for the sake of clarity.

A conveyor or carrier way is arranged above the conveyor chain 28 and preferably comprises a pair of laterally spaced horizontal bottom pieces 31 (Fig. 3), on which the cartons are adapted to be supported and between which brackets 27 project, and vertically spaced side pieces or guides 32, both said bottom and side pieces being secured to suitable uprights 33 which may in turn rest upon the floor or machine foundation, and one pair of which, as shown, may provide bearings 34 for shaft 30. Uprights 33 also support suitable horizontal channel members 35 which form ways for supporting and guiding rollers 36 carried by and extending outwardly on either side from conveyor chain 28.

As is shown best in Fig. 1a, the side pieces or guides 32 on one side of the carrier means are shorter than those on the other side, and the bottom piece 31 of the conveyor way on that side of the carrier is extended laterally to provide a transfer table 37 over which lined and filled cartons may be moved in being transferred to the carton carrier or advancing means from the means which supply the cartons to the liner closing and folding machine. In the form shown, the lined and filled cartons are supplied by means of a conveyor 38 of any suitable construction, said conveyor terminating adjacent the receiving end of the carrier means of the liner closing and folding machine and in such a location as to permit transfer of the cartons to said carrier means by suitable pusher mechanism such as that disclosed in Figs. 1a, 2a and 3. As therein shown, the lined and filled cartons C, open at the tops, are advanced by conveyor 38 until they abut a stop plate 39 suitably secured to a supporting member 40 adjustably mounted in any suitable way upon the machine framework and extending transversely across conveyor 38 to the side of the carrier means on which side pieces or guides 32 are broken away. As a carton abuts stop plate 39 it is in alignment with transfer table 37 and with an L-shaped pusher member 41 which is adapted to be reciprocated by suitable means to transfer the carton from conveyor 38 across transfer table 37 onto bottom members 31 of the conveyor way, in position to be engaged by a pusher member 26. During this transfer, the transverse arm of L-shaped pusher member 41 serves to maintain the next carton on conveyor 38 in place until pusher member 41 completes its reciprocation and is ready to transfer another carton, or, when used in conjunction with a conveyor having an automatic package stop mechanism, said pusher member 41 may be provided with a suitable trip member 42 for releasing the package stop mechanism upon each return stroke of said pusher member.

Although any suitable means may be provided for reciprocating pusher member 41, it is desirable that the operation of said member be synchronized with the movements of carrier chain 28 and pusher members 26, and the other elements of the liner and carton handling mechanism later to be described. Accordingly, pusher member 41 is secured to and carried by a suitable bracket 43 which may be formed integrally with a sleeve 44 slidably mounted upon a shaft 45, the latter being mounted transversely of the machine and supported in suitable bearings 46 secured to side frames 19 and 20. Adjustably connected to sleeve 44 is a suitable rack member 47 which is maintained in engagement with, as by a guide roller 48, and reciprocated by a gear 49 rotatably mounted on and supported by a stub shaft 50 which is secured to and depends downwardly from crosstie member 22. Secured to, and preferably formed integrally with, gear 49 is a pinion 51 which meshes with and is driven by a gear 52 secured to one end of a stub shaft 53 journaled in crosstie member 22. To the other end of stub shaft 53 is secured an arm 54 which, through a suitable connecting rod 55, is connected to one end of a bell crank 56 pivotally mounted as at 57 in any suitable manner on side frame 20 and adapted to be reciprocated about its pivot by the action of a cam roller 58 mounted on the end of said bell crank opposite to connecting rod 55 and in engagement with the cam groove of a cam 59. Cam 59 is mounted on one end of and continuously rotated by the main driving shaft 60 of the liner handling mechanism, said shaft extending transversely of the machine and being supported in suitable bearings 61 mounted on side frames 19 and 20.

Shaft 60 is the main drive shaft of the liner elongating, closing and folding mechanism, and is adapted to be continuously rotated in any suitable manner, as by a chain drive 62 from the main driving shaft (not shown) of the carton top sealing machine to which the liner handling mechanism is connected. Also, the rotation of main driving shaft 60 and the movement of conveyor chain 28 are synchronized, and preferably controlled by a common switch (not shown).

After a carton has been transferred by pusher member 41 from conveyor 38 across transfer table 37 and onto bottom pieces 31 of the conveyor way, its rear face is engaged by one of pusher members 26 and the carton is advanced through the machine, side pieces or guides 32 acting to maintain the carton vertical and centered on the conveyor way against any tendency for lateral displacement. As the lined and filled carton is thus advanced, with carton flaps and liner top open and upstanding in the condition indicated at position I of Fig. 17, it approaches mechanism which is provided for spreading the top of the liner longitudinally, or in the direction of movement of the carrier means, preparatory to the straightening, creasing and folding operations later to be described.

Figure 4:
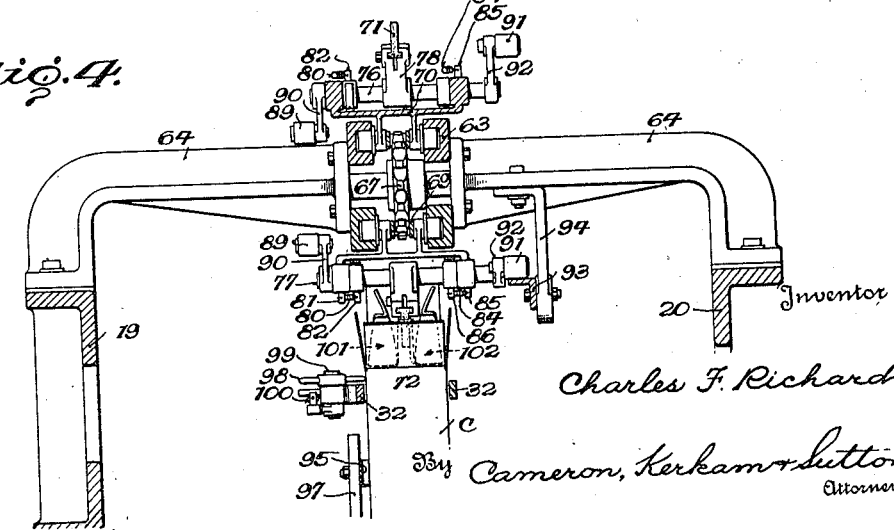

As shown in Figs. 1a, 2a and 4, suitable liner spreading or elongating mechanism may comprise a raceway framework 63 supported in a vertical plane directly above the path of travel of the cartons by a pair of supporting bracket members 64 which are secured at their outer ends to frame members 19 and 20 and extend transversely thereto across the machine with raceway framework 63 suitably secured to their inner ends. Mounted in suitable bearings at one end of raceway framework 63 is a shaft 65 on which is secured a sprocket 66. A similar sprocket 67 is secured to a shaft 68 rotatably mounted in bearings adjacent the opposite end of raceway 63, and a suitable chain 69 passes around both sprockets 66 and 67. Mounted on and detachably secured at intervals along chain 69 are a plurality of traveling carriers 70 on each of which is suitably mounted a pair of liner spreader members 71 and 72. Spreader members 71 and 72, which are shown as being made of hard rubber or other similar material, although they may comprise brushes of hair or the like, are pivotally mounted on carriers 70 and, while the latter are continuously moved around raceway 63, are adapted to penetrate into the open tops of carton liners and then to be separated or spread apart so as to spread or elongate the liner tops longitudinally in their direction of travel, the spreader members continuing to travel with the liners for a predetermined distance until the sides thereof have been straightened to substantially vertical position and the inner surfaces thereof have been brought closely adjacent one another by suitable fixed guide means later to be described. The continuous movement of chain 69 upon which carriers 70 are mounted is derived from main drive shaft 60 through a driving sprocket 73 secured to the latter, a driven sprocket 74 secured to shaft 68, and a suitable driving chain 75 encircling both sprockets 73 and 74.

In the embodiment shown, the means for pivotally mounting each pair of spreader members 71 and 72 on their carrier 70 and for separating them after they have penetrated the open top of a liner preferably comprises a pair of shafts 76 and 77 rotatably supported in suitable bearings transversely of carrier 70 and a pair of arms 78 and 79 secured to shafts 76 and 77, respectively, intermediate the ends thereof and in the same vertical plane as the center line of the carrier mechanism which advances the cartons through the machine. Spreader members or brushes 71 and 72 are removably secured in any suitable manner to the extremities of arms 78 and 79, respectively. Arms 78 and 79, and their attached spreader members 71 and 72, are normally resiliently urged to the positions occupied by those elements which are shown secured to the uppermost carriers in Fig. 2a. Arm 78 is resiliently urged to this position by a spring 80, one end of which is fixedly secured to the carrier 70 as at 81, while the other end is fastened to a pin 82 which is secured to shaft 76, thereby tending to rotate said shaft in a clockwise direction. A suitable stop member 83 is provided to limit the clockwise movement of arm 78. Arm 79 is likewise resiliently urged to the position shown by means of a spring 84 which has one end secured to carrier 70 as at 85 and the other end fastened to a pin 86 secured to shaft 77, thereby tending to rotate said shaft in a counterclockwise direction limited by a stop member 87.

As each carrier 70, with its arms 78 and 79 and spreader members 71 and 72 in the positions described, is continuously moved in a clockwise direction, through the driving connections described, it approaches the forward or right-hand end of raceway 63 to which is adjustably secured on one side thereof a substantially U-shaped cam plate 88. As carrier 70 moves around the end of raceway 63, a cam roller 89 carried by an arm 90 secured to one end of shaft 77 comes into engagement with cam plate 88 and, due to the shape thereof, rotates shaft 77 and moves arm 79 in a clockwise direction so as to point substantially vertically downwardly. Since chain 69 upon which carriers 70 are mounted derives its movement from main driving shaft 60, the movement of the carriers is synchronized with that of the carton carrier or advancing means, and spreader member 72 carried by arm 79 is thereby assured of ready penetration into the open top of a carton liner as the latter is moved under the spreader mechanism by the carton carrier means.

Chain 69 of the liner spreading mechanism and carriers 70 are not only moved in synchronism with the carton advancing means, but are also moved at the same speed therewith. Accordingly, further movement of carrier 70 around the forward end of raceway 63 and then along the bottom side thereof introduces spreader member 71 into the open top of the same liner into which spreader member 72 has already penetrated, arm 78 and spreader member 71 still maintaining their normal position which is substantially at right angles to carrier 70. Further movement of carrier 70 along the bottom of raceway 63, and now in company with one of the cartons, brings a cam roller 91, which is carried by an arm 92 secured to one end of shaft 76, into engagement with the upwardly inclined end of a cam rail 93 which extends substantially the length of raceway 63 and may be suitably supported in proper position by a hanger plate 94 secured to the underside of one of supporting bracket members 64. Engagement of cam roller 91 with cam rail 93 rotates shaft 76 and its attached arm 78 and spreader member 71 in a counterclockwise direction and thereby separates or spreads the latter from spreader member 70 so as to spread or elongate the liner top in its direction of travel, as indicated at position II of Fig. 17.

Spreader members 71 and 72 maintain this separated position during the travel of carrier 70 along the bottom of raceway 63 for a distance substantially equal to the horizontal portion of cam rail 93 shown in Fig. 2a, during which time the front and rear flaps of the carton are put down and the sides of the elongated liner top are straightened and brought closely adjacent one another so as to provide it with a substantially vertical portion which may then be creased and folded by mechanism later to be described. As carrier 70 approaches and moves around the rear or left-hand end of raceway 63, roller 91 passes off of cam rail 93, spreader members 71 and 72 pass upwardly out of the liner top, and arms 78 and 79 are returned to their original positions by springs 80 and 84.

If desired, suitable means may be provided for additionally steadying the cartons laterally and holding them firmly against their pusher members 26 during the time that the liner spreading mechanism is operative thereon. In the embodiment shown, a pair of resilient guide members 95 and 96 may be adjustably supported, as by brackets 97, on each side of the line of travel of the cartons in such position that they yieldingly engage the sides of the cartons intermediate the tops and bottoms thereof and thereby prevent any lateral displacement during the liner elongating and straightening operations.

The action of spreader members 71 and 72 in elongating the liner top may sometimes introduce an outward bow into the forward panel of the carton, and it may therefore be desirable to provide suitable means for removing this deformation of the package. One form of bow removing mechanism is shown in the present embodiment and may comprise a curved finger 98 which is rotatably supported adjacent the path of travel of the cartons in any suitable manner, as at 99 on one of guide members 32, and at a suitable height which may be just below the score lines of the carton tops. Bow removing finger 98 is normally resiliently urged into position directly in the path of the moving cartons by any suitable means such as a spring 100 having one end thereof secured to the machine framework and the other end operatively connected to said finger, so that when engaged by the forward panel of a moving carton said finger is moved about its pivot 99 in a counterclockwise direction, as viewed in Fig. 1a, against the tension of spring 100, and permits the carton to pass by, finger 98 at this time being in engagement with the side panel of the moving carton. As soon as the carton clears finger 98, spring 100 becomes effective to move said finger with a substantial amount of force about its pivot 99 in a clockwise direction so that it strikes the forward panel of the next succeeding carton a relatively smart blow which is sufficient to remove therefrom any bow which may have been caused by the action of the liner elongating mechanism or otherwise.

As has previously been mentioned, at the time that the cartons are brought beneath the liner elongating mechanism the front, rear and side flaps of the carton top are in a substantially vertical position, and the liner elongating operation does not disturb said flaps except to press the front and rear flaps slightly outwardly, as indicated at position II in Fig. 17. During the time that the liner elongating members are in engagement with the liner tops, however, additional means become effective to lay the front and rear carton flaps downwardly to substantially horizontal positions and to simultaneously straighten the sides of the elongated liner tops to substantially vertical position bringing the inner surfaces thereof closely adjacent one another, said means being so disposed as to lie entirely between the lines of travel of the carton side flaps and not to disturb the vertical positions thereof.

In the form shown, these functions are performed by a pair of fixed guide members 101 and 102 substantially L-shaped in cross section, as shown best in Fig. 17, the substantially horizontal arms 103 of said members serving to engage, put down and hold down the front and rear carton flaps, and the vertical arms 104 acting to straighten the sides of the elongated liner tops to substantially vertical position and bring the same closely adjacent one another preparatory to the creasing and folding operations later to be described. Fixed guide members 101 and 102 are adjustably supported at their rear ends 105 upon suitable hanger members 106, secured at their upper ends in any desired manner to crosstie member 23, with horizontal portions 103 substantially level with the score lines of the carton tops and with the outer edges thereof disposed entirely within the lines of travel of the carton side flaps. The forward ends of fixed guide members 101 and 102 are upwardly inclined so that the upper edges of the front and rear carton flaps will pass thereunder and be gradually moved downwardly thereby to a substantially horizontal position. The vertical portions 104 of fixed guide members 101 and 102 are sufficiently high to embrace the elongated liner tops, and gradually approach one another and decrease in height so as to progressively straighten and flatten the sides of the elongated liner tops to a substantially closed vertical position, as indicated at position III in Fig. 17.

As the now straightened, substantially closed liner top emerges from between the rear ends of the vertical portions 104 of fixed guide members 101 and 102, it is moved between a pair of suitable vertically disposed creasing rolls 107 and 108 which apply pressure to the elongated liner top and crease the edges thereof so as to press the opposite sides together and provide a uniform article to be operated upon by the fixed folders, later to be described. Creasing rolls 107 and 108 are mounted in any suitable manner upon a pair of vertical shafts 109 and 110 directly in the line of movement of the elongated liner top and wholly within the paths of the carton side flaps. Creasing rolls 107 and 108 are preferably of substantially the same height as the portion of the liner tops in which all of the folds are to be made. Shafts 109 and 110 may be rotatably supported in proper position in any suitable manner as by a suitable bearing bracket 111 which may be secured to hanger members 106, as shown, or to any other desired part of the machine framework. Shafts 109 and 110 are continuously rotated, preferably at a speed such that the peripheral linear speed of creasing rolls 107 and 108 is substantially equal to the speed of movement of the liner tops passing therebetween, by suitable means which in the present embodiment comprise a sprocket wheel 112 secured to the upper end of shaft 109 and driven through a suitable chain 113 which also passes around a similar sprocket secured to a vertical shaft 114 which is journaled in crosstie member 23 and driven from main driving shaft 60 through a pair of bevel gears 115. The rotation thus imparted to shaft 109 is also transmitted to shaft 110 by a pair of interengaging pinions 116 mounted on said shafts.

After passing between creasing rolls 107 and 108, the elongated liner top has a vertically upstanding portion with the opposite faces in contact with one another and a pair of flat horizontal portions substantially on a level with the score lines of the carton top, one on each side of the vertical portion, as indicated at position IV in Fig. 17, thus presenting a uniform and neat article upon which the fixed folders, next to be described, may operate.

In order to effectively close the liner against loss of its contents and to render it as nearly moisture-proof as possible without the use of a heated seal, suitable means are provided for forming a plurality of over-and-over folds in the closed and creased liner top as it continues its movement through the machine. As shown best in Figs. 5–11, this folding of the liner top is accomplished by a plurality of sets of fixed folders located in the line of travel of the liner tops but wholly within the paths of the carton side flaps so that the folding operations may be accomplished without the necessity for disturbing the normal vertical positions of the latter. The folding mechanism may also be provided with suitable creasing means for creasing each fold after it has been made.

In the embodiment shown, the fixed folders are formed by a pair of stepped blocks 116 and 117 suitably suspended from crosstie members 24 and 25 in the line of travel of the liner tops, and just above the level of the score lines of the carton tops, with a passageway 118 therebetween of sufficient width to permit the passage therethrough of the vertical portions of the liner tops. The combined width of blocks 116 and 117 is somewhat less than the distance between the carton side flaps so that said blocks may lie entirely between the paths of movement of said flaps. As indicated in Figs. 2, 5, 13 and 14, folder block 117 is supported in a fixed position by a suitable bracket member 119 secured to crosstie member 24 and by a rod 120, the upper threaded end of which extends through crosstie member 25 and is secured thereto by a suitable nut 121, while folder block 116 is supported in such a manner as to be movable laterally relatively to block 117, both for adjustment purposes and in order that the folder elements may be readily cleaned and cleared of torn or mutilated liner tops should jams occur therein.

To this end, block 116 has secured thereto at positions adjacent crosstie members 24 and 25 substantially L-shaped bracket members 121 and 122, the horizontal arms of which are slidably supported in suitable guide members 123 and 124 projecting from and secured to crosstie members 24 and 25, respectively, and have secured to their outer extremities rods 125 and 126 which extend transversely of the machine framework and terminate in suitable operating handles 127 and 128. Folder block 116 is normally yieldably urged toward block 117 by means of suitable springs 129 and 130 each secured at one end to one of bracket members 121 and 122 and at the other end to one of pins 131 and 132 mounted on crosstie members 24 and 25, respectively. The normal position of folder plate 116, and hence the width of passageway 118, is determined by the positions of suitable stop pins or bolts 133 and 134 carried by and adjustable relatively to bracket members 121 and 122 and abutting the outer edges of guide members 123 and 124 so as to limit the inward movement of said bracket members relative to said guide members.

The first set of fixed folders is formed by the highest portion of stepped folder blocks 116 and 117, an irregularly shaped folder plate 135 secured to the top of block 116 and projecting over a portion of the passageway 118, a diagonal groove 136 of varying depth formed in block 117, and a trapezoidal-shaped deflecting plate 137 secured to the top of block 117 and extending over groove 136. Folder plate 135 has its forward edge extending obliquely across passageway 118 and serves to fold the vertical portion of the liner top over to the right, as viewed from the right or receiving end of the machine, through an angle of substantially 90°, while deflecting plate 137 guides or deflects the leading edges of the now horizontal portion of the liner top into groove 136 so as to complete the first 180° fold.

The once folded liner top upon emerging from the first set of fixed folders is then engaged and creased by a second pair of creasing rolls 138 and 139. Creasing rolls 138 and 139 are of substantially the same construction as the first set of creasing rolls 107 and 108 except that they are shorter, being adapted to embrace only the once folded portion of the liner top. Rolls 138 and 139 are mounted on suitable shafts 140 and 141 drivingly connected together by suitable pinions and supported in suitable bearings carried by crosstie member 24, similarly to rolls 107 and 108. The drive for rolls 138 and 139 may be derived in any suitable manner, the embodiment illustrated including an auxiliary drive shaft 142 extending longitudinally of the machine and suitably journaled in bearings supported by crosstie members 24 and 25, which shaft is driven from main driving shaft 60 through a pair of bevel gears 143, one of which is carried by a vertical stub shaft 144 which is in turn drivably connected to main shaft 60 through another pair of bevel gears 145. Creasing roll shaft 141 is then driven from auxiliary driving shaft 142 through a suitable stub shaft and bevel gear power take-off arrangement indicated generally at 146. Similarly to the first set of creasing rolls 107 and 108, the gear ratios of the drive of the second set are so selected that the peripheral linear speed of rolls 138 and 139 is substantially equal to the speed of movement of the cartons through the machine.

The second set of fixed folders is formed by an irregularly shaped folder plate 147, a diagonal groove 148 and a trapezoidal deflecting plate 149 which are substantially identical with the corresponding elements 135, 136, 137 of the first set except that the elements of the second set are secured to or formed in the intermediate portion of folder blocks 116 and 117, at a lower level than the first set, in order to operate upon the now shortened upstanding portion of the liner top. At the exit end of the second set of fixed folders there is also provided another, the third, set of creasing rolls 150 and 151 mounted on vertical shafts 152 and 153 and also driven from auxiliary driving shaft 142 through a suitable power take-off transmission indicated generally at 154, all similar to the construction and operation of the second set of creasing rolls. In addition, the third set of rolls may be provided, if desired, with suitable scraper members 155 and 156 which are maintained in proper position to engage the peripheries of rolls 150 and 151, and to remove any foreign material which might be gathered thereon, by a pair of supporting members 157 and 158 which may be secured at their upper ends to a bearing bracket member 159 in turn secured to crosstie member 25 and supporting shafts 152 and 153. It will be understood that similar scraper means may be provided for the first and second set of creasing rolls, if desired.

Referring now to Figs. 17 and 17a in conjunction with Figs. 5–11, the progress of the liner top through the fixed folder mechanism may be followed step by step. In position IV, the carton has just passed from between the first set of creasing rolls 107 and 108, the liner top is closed, creased and vertical as the result of the operation of said rolls, and the forward end thereof has just entered the passageway 118 formed between folder blocks 116 and 117. As the forward edge of the vertical liner top comes into contact with the diagonally slanting forward edge of folder plate 135, the first fold of the liner top is made, the upper portion thereof being bent over substantially at right angles, or to a horizontal position, relative to the rest of the top, between the bottom surface of folder plate 135 and the upper surface of block 117. Fig. 7 shows how this fold is made. As the carton is advanced, and while the now horizontal outer portion of the liner top is still under the overhanging edge of folder plate 135, the forward edge of said portion passes under deflection plate 137 and is started down into the shallow, outer end of diagonal groove 136. Groove 136 not only slants diagonally inward toward passageway 118 but also continually increases in depth so that continued advance of the carton causes the outer end of the liner top to follow the curvilinear path formed by groove 136 and to be folded through another 90°, or to a substantially vertical position such as is shown in position V of Fig. 17. Fig. 8 shows how this fold is made. The now once folded portion of the liner top then passes between the second set of creasing rolls 138 and 139 so as to compress and crease the edge of the first 180° fold. The second 180° fold is made by plates 147 and 149 and groove 148, as indicated in Figs. 9 and 10, in the same manner as the first fold except that the height of the folders is decreased by the stepped construction of blocks 116 and 117, the height of the upstanding portion of the liner top thus constantly decreasing as the successive folds are made. The folds produced by this second set of fixed folders are as shown in positions VI and VII of Figs. 17 and 17a. After the second 180° fold has been made, the now twice folded liner top is passed between the third set of creasing rolls 150 and 151 and again compacted and creased.

After passing between the third set of creasing rolls, the twice folded and creased liner top projects vertically upwardly from the liner and carton as shown in position VII of Fig. 17a, and suitable means must be provided for folding or flattening said liner top to a substantially horizontal position about on a level with the score lines of the carton flaps so that the latter may be folded in on top of the liner, and the carton itself may be sealed. For this purpose, the rear, or left as viewed in the figures, extremities of folder blocks 116 and 117, constituting the lowest step thereof, are provided with a final pair of fixed folder members or plates 160 and 161. As shown, plate 160 has a horizontal portion 162 which rests upon and is suitably secured to the top of the folder block 116, and a folding or flattening portion 163 which is substantially vertical and coplanar with the inner edge of block 116 at its forward end but gradually and continually turns inwardly and downwardly over passageway 118 and block 117 until, at its left or rear end, it is substantially horizontal and coplanar with portion 162. Plate or block 161 comprises a horizontal portion 164 which rests on top of and is secured to the folder block 117, and a downwardly offset horizontal portion 165 which is disposed within a recess 165' formed in block 117 and which underlies the flattening or folding portion 163 of plate 160. Portion 165 of plate 161 may be made as thin as desired, and is so located that as the vertical, folded and creased liner top passes between plates 160 and 161 it is gradually folded or flattened over on top of the liner to a horizontal position substantially level with the score lines of the carton top. After passing through this last set of fixed folders, the liner top occupies substantially the position shown in position VIII of Fig. 17a, and the carton is ready to have its top flaps folded in and sealed to complete the package.

Since it may be desirable to make the last set of folder plates 160 and 161, or the portions of folder blocks 116 and 117 supporting the same, wider than the rest of the liner folder mechanism, in order to permit the proper support from crosstie member 25, suitable means may be provided for spreading and moving to substantially horizontal positions the side flaps of the carton, which during all of the previous liner foldng operations have retained their original vertical positions, in order that the cartons may pass beneath these widened elements without interference. In the form shown, said means are provided by securing to, or forming integrally with, the lowest stepped portions of folder blocks 116 and 117 laterally projecting flap guide members 166 and 167, the forward ends of which are curved upwardly and inwardly, as indicated best in Figs. 5 and 15, and then gradually flatten outwardly to substantially horizontal portions abreast the last set of fixed folder plates 160 and 161. The forward ends of flap gude members 166 and 167 preferably extend in front of the last set of creasing rolls 150 and 151 so as to penetrate between and engage the vertical carton side flaps just before the folded liner top reaches the said creasing rolls. Continued advance of the carton then causes the side flaps to follow the contour of the under surfaces of guide members 166 and 167 and to be laid down to substantially horizontal positions thereby by the time that the liner top enters the last set of fixed or flattening folders.

From ths last set of fixed folders which flatten the folded and creased liner top down substantially level with the top of the carton, the carton passes to the mechanism for folding in the front and rear end flaps prior to its passage into the carton sealing apparatus. As shown in position VIII of Fig. 17a, the extremities of the flattened liner top at this time extend forwardly and rearwardly beyond the front and rear panels of the carton and overlie portions of the front and rear carton flaps, the latter having now passed from beneath folder blocks 116 and 117 and thus being free for upward and inward movement. Means must therefore be provided for folding these extremities into the confines of the carton either independently or at the same time that the end flaps are folded in. In the embodiment shown, suitable mechanism is provided for engaging the top surface of the liner so as to hold it and its carton down upon the conveyor ways while the front and rear end flaps and the overlying extremities of the liner top are first struck upwardly toward a vertical position and then positively folded inwardly and downwardly on top of the liner and within the carton. Means are also provided for moving the side flaps downwardly to positions well below the horizontal in order to be out of the way of said liner engaging and flap striking and folding mechanism.

In the embodiment illustrated, side frame 18 is reduced in height rearwardly, or to the left, of crosstie member 25 and has secured thereto a box-like housing 168 (Figs. 1, 2 and 16) provided with oppositely disposed side openings 169 and 170, in the top of which housing is suitably supported, as in a bearing boss 171, a vertical stub shaft 172. Shaft 172 is adapted to be driven in synchronism with the other elements of the machine from main driving shaft 60, and to this end has secured to its upper extremity a sprocket 173 driven by a suitable chain 174 from a sprocket 175 fixed on a stub shaft 176 which is rotatably supported in a suitable bearing member 177 mounted on crosstie member 25. Shaft 176 also carries a sprocket 178 driven by a chain 179 from a sprocket 180 (Fig. 2a) secured to vertical shaft 114, the latter being driven from main driving shaft 60 through bevel gears 115 previously described. The tension of driving chain 174 may be suitably adjusted by a roller 180 supported in engagement with said chain by an arm 181 adjustably mounted in any suitable manner on bearing boss 171.

Secured to the lower end of shaft 172 and rotatable therewith is an arm or link 182 having an elongated slot 183 therein adjacent its outer end. Arm 182 rotates beneath a fixed cam plate 184 secured to the top of housing 168 and having an eccentric cam groove 185 formed therein. Extending through slot 183, the length of which is substantially equal to the difference between the maximum and minimum distances of cam groove 185 from the axis of shaft 172, and engaging cam groove 185, is a cam roller 186 suitably mounted on a slide 187 which is supported in a carriage 188 for movement transverse to the direction of travel of the carton through the machine, said carriage being in turn mounted for sliding movement parallel to the direction of movement of the carton on a pair of rods or guides 189. With this construction, rotation of shaft 172 and arm 182 imparts to carriage 188 a forward and backward reciprocating movement parallel to the movement of the carton, while at the same time slide 187, which is carried bodily backward and forward by carriage 188, is also reciprocated inwardly and outwardly, or transversely to the direction of movement of the carton. During this movement of slide 187, its ends extend outwardly through side openings 169 and 170 of housing 168. The direction of rotation of shaft 172 is counterclockwise, as viewed in Fig. 1, so that slide 187 comes in approaching the carton, travels with the carton for a predetermined distance, then moves outwardly away from the carton and returns for the next cycle.

Mounted on the underside of the inner end of slide 187 is a bearing 190 (Figs. 16 and 17a) in which is fixedly supported a shaft 191, the extremities of which extend forwardly and rearwardly beyond the sides of bearing 190 and slide 187. Freely mounted on shaft 191 by a pair of bearing bosses 192 is an H-shaped presser or reaction member 193, two of the arms of which extend inwardly beyond the end of slide 187 and are adapted to be moved into engagement with the top of the folded liner to hold the carton down while the front and rear end flaps and the overlying extremities of the folded liner top are folded in. The distance between the arms of H-shaped reaction member 193 is slightly less than the length of a side panel of the carton, and the lengths of said arms are preferably such that they extend inwardly across substantially the entire width of the carton top, as indicated in broken lines in Fig. 16. Presser or reaction member 193 is normally maintained in an upwardly directed angular position relative to slide 187 by any suitable means such as a coil spring 194, one end of which is secured to one of bosses 192 while the other end is fastened to a collar 195 secured to shaft 191. Mounted on one of bosses 192 and projecting downwardly therefrom is a spindle 196 on the lower end of which is rotatably mounted a cam roller 197. As slide 187 is moved inwardly toward a carton through opening 170 in the side of housing 168, cam roller 197 engages a fixed cam plate 198 suitably supported on housing 168 as by bracket members 199, further inward movement of the slide causing presser or reaction member 193 to be moved downwardly about shaft 191 as a pivot into engagement with the top of the folded liner, as shown in the broken lines in Fig. 16, so as to prevent upward movement of the carton during the infolding of the front and rear end flaps.

Slide 187 also carries on its upper surface at its inner end a bearing 200 in which is rotatably supported a shaft 201, the extremities of which extend forwardly and rearwardly beyond the ends of said bearing and sides of slide 187. Fixedly secured to each end of shaft 201 is a collar 202 which has secured thereto, or formed integrally therewith, a flap-striking finger 203 of suitable construction, said fingers being adapted to engage the outer surfaces of the front and rear flaps of the carton and to strike said flaps upwardly to substantially vertical positions. Shaft 201 is normally maintained in such a position that fingers 203 extend downwardly therefrom below the level of the positions of the front and rear flaps by a suitable spring 204, one end of which is anchored in bearing 200 while the other end is secured to one of collars 202. Secured to the portion of shaft 201 between the other collar 202 and bearing 200 is an upwardly extending arm 205 on the end of which is rotatably mounted a cam roller 206. As slide 187 is moved inwardly toward a carton and presser or reaction member 193 is moved downwardly on top of the liner top by the engagement of cam roller 197 with cam 198, cam roller 206 comes into engagement with a fixed cam plate 207 which may be suitably supported in position to be engaged by said cam roller as by an inwardly extending supporting arm 208 suitably secured to the top of housing 168.

As cam roller 206 engages cam plate 207, continued inward movement of slide 187 causes shaft 201 to be rotated within its bearing 200 so that fingers 203 are raised beneath the then substantially horizontal front and rear flaps of the carton and strike said flaps, together with the overlying extremities of the folded liner top, upwardly to a substantially vertical position, as indicated in broken lines in Fig. 16 and at position IX in Fig. 17a. The end flaps are then in position to be engaged by the mechanism for folding them inwardly on top of the liner. It will be understood that presser or reaction member 193 and fingers 203 are withdrawn out of engagement with the carton in time for such folds to be made, due to the continuous movement imparted to slide 187 by the engagement of cam roller 186 with cam groove 185.

As previously mentioned, it is preferable that means also be provided for moving the carton side flaps downwardly to positions substantially below the horizontal prior to and during the operation of the flap striking means just described. In the form shown, a pair of flap guide rails 209 are supported in any suitable manner from the machine framework, or from guide members 32 of the carton conveyor means, in positions closely adjacent the path of travel of the carton and intermediate the liner flattening and flap striking stations. Guide rails 209 are provided at their forward ends with pointed portions 210 at which are located above the horizontal plane of the score lines of the carton tops and which extend forwardly so as to overlie the rear end of the last set of fixed or flattening folders. With this construction, as the cartons emerge from beneath said flattening folders, the carton side flaps are engaged by the undersides of the pointed ends 210 of guide rails 209 and, due to the downwardly and outwardly curving construction of said rails, are put down to positions materially below the horizontal, as indicated in Fig. 16. Guide rails 209 preferably extend rearwardly to a position approximately opposite to the point in the travel of the cartons where presser or reaction member 193 reaches its lowermost position in contact with the liner top.

As the carton continues to be advanced with the flaps and the folded and creased liner top in the positions indicated at IX in Fig. 17a, the front end flap with its overlying extremity of the liner comes into engagement with the upwardly turned forward end 211 of a fixed flap folding and retaining plate 212 of any desired construction which may form part of a carton top sealing machine of known construction, the elements of which are indicated only diagrammatically in the accompanying drawings. Continued movement of the carton under fixed folder plate 212 turns the forward end flap and the forward extremity of the folded liner inwardly and downwardly on top of the liner within the carton. At the same time that the front end flap is being engaged by plate 212, the carton is passing beneath suitable mechanism for kicking the rear end flap and its overlying extremity of the folded liner top inwardly and downwardly on top of the liner so that said flap will also pass under and be held down by plate 212. In the form shown, a horizontally extending flap engaging stud or finger 213 is secured to the lower end of an arm 214 which is in turn secured to a stub shaft 215 rotatably supported in the end of a bearing arm 216. Arm 216 is rigidly mounted on a shaft 217 which is supported above and transverse to the line of travel of the cartons by suitable bearing brackets 218 secured to crosstie member 25. The location of bearing arm 216 on shaft 217 and the length of flap engaging stud or finger 213 are such that the latter extends transverse to and in position to engage the outer surface of the rear end flap of the carton and, when actuated by suitable mechanism next to be described, to kick said flap forward and downward so that it will pass under the upwardly curved end 211 of fixed folder plate 212.

In order that flap engaging stud or finger 213 may perform its desired function, it is preferably given both a movement with the carton, during the time that the flap is being kicked forward, and an additional movement relative to the carton to effect the forward and downward movement of the flap. In order to impart the first mentioned movement to arm 213, shaft 217 has secured thereto at one end (the near end as viewed in Fig. 2) a pinion 219 which is engaged by a rack 220 secured to, or formed integrally with, a connecting rod 221, the opposite end of which is connected to one arm 222 of a bell crank pivotally supported on side frame 18 as at 223. The other arm 224 of said bell crank carries a cam roller 225 (Fig. 1a) which is in engagement with the groove of a suitable cam member 226 secured to the end of main driving shaft 60 opposite to that on which cam member 59, previously referred to, is secured. Vertical movement of rack 220 out of engagement with pinion 219 is prevented by means of a roller 227 which is mounted on bearing bracket 218 and engages the top surface of said rack during its reciprocating movements.

Through the connections thus described, shaft 217 is continuously oscillated swinging bearing arm 216 and flap engaging stud or finger 213 in synchronism with the successive cartons as they pass below said mechanism and then returning said arm and finger to the position shown in Figs. 1 and 2 ready for engagement with the next carton. During this bodily swinging movement of arm 216 and flap engaging finger 213, the latter is also given an independent swinging movement so as to kick the rear end flap of the carton forward and under fixed folder plate 212. For this purpose, shaft 215 has secured to its end opposite arm 214 another arm 228 on the extremity of which is rotatably mounted a suitable cam roller 229 adapted to travel in the groove 230 of a suitable cam plate 231 which is adjustably secured to bearing bracket 218. As flap engaging finger 213 is swung bodily in synchronism with the movement of the carton by shaft 217 and its associated driving mechanism, engagement of cam roller 229 with cam groove 230 oscillates shaft 215 in its bearing and swings arm 213 rearwardly relatively to the carton so as to tuck the rear end flap under the upturned end 211 of plate 212.

After both of the front and rear end flaps have been folded in in the manner just described and the carton moves forward under flap folding and retaining plate 212, further advance of the carton brings it beneath suitable mechanism for applying an adhesive to the side flaps and then folding them in on top of the infolded end flaps so as to seal the carton in the well known manner. In the mechanism illustrated diagrammatically in the drawings, the adhesive applying mechanism comprises a pair of suitable glue rolls 232 with which are associated glue receptacles 233, rolls 232 being adapted to apply adhesive to the inner surface of each of the carton side flaps.

In order to facilitate the application of the adhesive to the side flaps, a pair of flap lifting members or guide rails 234 may be provided, the forward ends of which are curved downwardly so as to project between the side panels of the cartons and the side flaps thereof as the latter are held down by guide rails 209, the rearward portions of flap lifting members 234 being upwardly inclined and enlarged as indicated at 235 so as to positively press the carton flaps upwardly against glue rolls 232.

After the adhesive has been applied to the carton side flaps, the latter are alternately folded inwardly on top of the already folded front and rear end flaps by fixed folders 236 of known construction. Still further advance of the carton brings it beneath transversely reciprocable sealing rolls 237, also of known construction, which press the glued flaps tightly together and effectively complete the carton sealing operation.

Although it is believed that the operation of the machine disclosed herein is apparent from the preceding description, the various operations which are performed thereby may be summarized as follows: Cartons provided with inner liners or bags of any suitable material, open at the top and filled with any desired substance, are continuously supplied to the receiving end of the machine from any suitable source, such as a filling and weighing machine, by means of the conveyor 38. The lined and filled cartons thus supplied to the machine are then transferred laterally one by one by pusher member 41 to a continuously moving carrier mechanism which extends the entire length of the machine. The reciprocation of pusher member 41, as well as the movements of all of the other movable elements of the machine which act upon the cartons and their liners, are synchronized with those of the carrier means by virtue of the fact that all of said elements derive their motion from main driving shaft 60, which in turn may be driven by or drive the mechanism which actuates the carrier means.

Upon transfer to the carrier means, each carton is engaged by a continuously moving pusher member 26 and is constantly advanced thereby through the machine. The carton with its vertically upstanding liner and carton flaps first passes under the liner spreading or elongating mechanism, spreader members 71 and 72 of one of carriers 70 extending into the open liner top and by engagement of cam rollers 91 and 89 with cam rail 93 and cam plate 88, respectively, being spread apart or separated so as to spread or elongate the liner top in the direction of movement of the carton. While spreader members 71 and 72 are thus engaged within the open liner top, and are continuously moving therewith, spring pressed finger 98 strikes the forward panel of the carton a relatively smart blow so as to remove any bow therefrom which may have been caused by the initial engagement of the spreader members with the liner top or otherwise. Continued advance of the carton brings the elongated liner top with the spreader members 71 and 72 still engaged therewith between fixed guide members 101 and 102 which both put down and retain the front and rear carton flaps in substantially horizontal positions and simultaneously straighten the sides of the elongated liner top to substantially vertical position, bringing the inner faces thereof closely adjacent one another, at the same time leaving the carton side flaps in their original vertical positions. Spreader members 71 and 72 are withdrawn from the liner top after the latter has started between fixed guide members 101 and 102. After the elongated and straightened top emerges from between said guide members it passes between the first set of creasing rolls 107 and 108 whereby the edges are firmly creased and the elongated liner top completely closed so as to form a uniform vertically upstanding article for the folder mechanism to operate upon. The effect of spreader members 71 and 72 is indicated at position II of Fig. 17, while position III shows the condition of the carton and liner top after fixed guide members 101 and 102 have operated thereon and just before entering between the first set of creasing rolls.

Continued advance of the carton moves the liner top into the passageway 118 between fixed folder blocks 116 and 117 of the fixed folder mechanism, and as the liner top is moved therethrough, it follows a curvilinear path and is folded over upon itself a plurality of times by the cooperative action of folder plates 135 and 147, deflector plates 137 and 149, and grooves 136 and 148, the successive folds being clearly indicated in positions IV, V, VI and VII of Figs. 17 and 17a. Also, after each set of fixed folders has operated upon the liner top, the newly made fold is firmly creased by passage of the liner top through the second and third sets of creasing rolls 138 and 139, and 150 and 151.

Upon emerging from the third set of creasing rolls, the now twice folded and creased vertical liner top is moved between the last set of fixed folders 160 and 161 which flatten the liner top down to a horizontal position substantially level with the score lines of the carton top, as shown in position VIII of Fig. 17a. Just before entering this last set of fixed or flattening folders, the carton side flaps are moved downwardly from their original vertical positions to substantially horizontal positions by flap guide members 166 and 167.

Upon emerging from the last set of fixed or flattening folders, the carton side flaps are engaged by guide rails 209 and moved downwardly even lower to a position materially below the horizontal while the carton approaches the mechanism which strikes up and folds in the front and rear end flaps of the carton preparatory to the final closing and sealing of the carton top. At this point, slide 187 is moved inwardly toward and at the same time forwardly with the carton, and when cam roller 197 engages cam plate 198, presser or reaction member 193 is lowered into engagement with the flattened and creased liner top to prevent the carton from being lifted upwardly off of the conveyor ways when continued movement of slide 187 brings cam roller 206 into engagement with cam plate 207 and throws flap striking fingers 203 upwardly, engaging the outer surfaces of the front and rear end flaps and kicking them and their overlying extremities of the folded liner top upwardly to substantially vertical positions, as shown at position IX in Fig. 17a.

As the carton advances further, the now substantially vertical front end flap is engaged, and moved inwardly and downwardly, by the upturned end of flap folding and retaining plate 212, while at the same time stud or finger 213 is swung into engagement with the outer surface of the rear end flap by the oscillation of shaft 217, and by movement of cam roller 229 in cam groove 230 is moved so as to kick said flap forwardly and downwardly in time to catch beneath the end of plate 212. The carton is then moved beneath the adhesive applying mechanism wherein the carton side flaps are lifted into engagement with glue rolls 232 by flap lifting members 234, and are thereafter alternately turned inwardly and downwardly on top of the already infolded end flaps by folder members 236, the sealing being finally effected by the pressure on the outside of said folded flaps of rollers 237.

There is thus provided by the present invention a new and improved machine for closing, folding and creasing the top of the liner or bag of a lined carton prior to the closing and sealing of the carton itself. The novel mechanism herein disclosed is automatic in operation and continuously closes, folds and creases in a rapid and efficient manner the liner tops of a succession of cartons as they are continuously advanced through the machine. The liner tops are given a plurality of over-and-over folds and each fold is creased between pressure rolls, the result being a liner which is substantially sift-proof and moisture-proof even without a heat seal. In order that the folding of the liner tops may be performed efficiently and rapidly, novel means are also provided for preliminarily elongating, straightening and creasing the sides of the liner tops in order that they may present a uniform article for the folding mechanism to operate upon. The folder mechanism is also so constructed and arranged that it is not necessary to move the carton side flaps from their normal vertical positions until just before the final infolding and sealing of the carton flaps themselves. Novel means have also been embodied in the present machine for removing any bow or distortion in the shape of the cartons which may be caused by operation of the liner elongating mechanism or otherwise. All of the novel elements of the machine herein disclosed are synchronized in their movements and cooperate in an efficient manner to produce a unitary, high speed machine for handling, closing and sealing a lined carton.

It will be obvious that the invention is not limited to the form shown in the drawings but is capable of a variety of mechanical embodiments. For example, any of the numerous motion producing mechanisms described may be replaced with equivalent arrangements capable of achieving the same result, and any suitable type of conveyor or carrier means may obviously be employed in place of the well known means illustrated. Also, although two sets of fixed folders have been shown for making the over-and-over folds, it will be understood that any desired number of sets may be used. Likewise, any of the various sets of creasing rolls may be omitted if found unnecessary for satisfactory operation of the mechanism. While the fixed folder elements may be made of any suitable material, such as wood, metal or composition, it has been found that where liners of wax impregnated paper or the like are employed, the use of chromium plated folders apparently reduces the accumulation of wax and the like thereon to a minimum, due to their more or less slippery surface. Moreover, although the apparatus has been described as adapted for connection to, or embodiment in, a complete carton sealing machine so that the movement of the cartons is continuous therethrough, it will be understood that the various elements of the mechanism constituting the present invention may also be used independently, or in combination with any other desired form of apparatus.

Various other changes, which will now appear to those skilled in the art, may be made in the form, details of construction and arrangement of the parts without departing from the spirit of the invention, and reference is therefore to be had to the appended claims for a definition of the limits of the invention.

What is claimed is:

1. In a machine for handling cartons having inner liners, the combination of carrier means for advancing the cartons through the machine, means for elongating the liner tops in the direction of movement of said carrier means, fixed guide means for straightening the sides of the elongated liner tops to substantially vertical position and for bringing the inner surfaces thereof closely adjacent one another, means for closing and creasing the vertical elongated portions of said liner tops, and means for folding said closed and creased vertical portions.

2. In a machine for handling cartons having inner liners, the combination of carrier means for advancing the cartons through the machine, means for elongating the liner tops in the direction of movement of said carrier means, fixed guide means for straightening the sides of the elongated liner tops to substantially vertical position and for bringing the inner surfaces thereof closely adjacent one another, means fixed in the path of movement of said liner tops for creasing the vertical elongated portions thereof, and means for folding said creased vertical portions.

3. In a machine for handling cartons having inner liners, the combination of carrier means for advancing the cartons through the machine, means for elongating the liner tops in the direction of movement of said carrier means, fixed guide means for straightening the sides of the elongated liner tops to substantially vertical position and for bringing the inner surfaces thereof closely adjacent one another, pressure roll means for closing and creasing the vertical elongated portions of said liner tops, and means for folding said closed and creased vertical portions.

4. In a machine for handling cartons having inner liners, the combination of carrier means for advancing the cartons through the machine, means for elongating the liner tops in the direction of movement of said carrier means, fixed guide means for straightening the sides of the elongated liner tops to substantially vertical position and for bringing the inner surfaces thereof closely adjacent one another, means comprising a pair of rolls between which the liner tops are moved by said carrier for engaging and creasing the vertical elongated portions thereof, and means for folding said creased vertical portions.

5. In a machine for handling cartons having inner liners, the combination of carrier means for advancing the cartons through the machine, means for elongating the liner tops in the direction of movement of said carrier means, fixed guide means disposed between the lines of travel of the carton side flaps for straightening the sides of the elongated liner tops to substantially vertical position and for bringing the inner surfaces thereof closely adjacent one another, means for closing and creasing the vertical elongated portions of said liner tops, and means for folding said closed and creased vertical portions.

6. In a machine for handling cartons having inner liners, the combination of carrier means for advancing the cartons through the machine, means for elongating the liner tops in the direction of movement of said carrier means, fixed guide means disposed between the lines of travel of the carton side flaps for straightening the sides of the elongated liner tops to substantially vertical position and for bringing the inner surfaces thereof closely adjacent one another, means fixed in the path of movement of said liner tops and also disposed between said lines of travel of the carton side flaps for creasing the vertical elongated portions of said liners, and means for folding said creased vertical portions.

7. In a machine for handling cartons having inner liners, the combination of carrier means for advancing the cartons through the machine, means for elongating the liner tops in the direction of movement of said carrier means, fixed guide means for moving the front and rear carton flaps to substantially horizontal positions and for simultaneously straightening the sides of the elongated lines tops to substantially vertical position and bringing the inner surfaces thereof closely adjacent one another, means for closing and creasing the vertical elongated portions of said liner tops, and means for folding said closed and creased vertical portions.

8. In a machine for handling cartons having inner liners, the combination of carrier means for advancing the cartons through the machine, means for elongating the liner tops in the direction of movement of said carrier means, fixed guide means disposed between the lines of travel of the carton side flaps for moving the front and rear carton flaps to substantially horizontal positions and for simultaneously straightening the sides of the elongated liner tops to substantially vertical position and bringing the inner surfaces thereof closely adjacent one another, means for closing and creasing the vertical elongated portions of said liner tops, and means for folding said closed and creased vertical portions.

9. In a machine for handling cartons having inner liners, the combination of carrier means for advancing the cartons through the machine, means for elongating the liner tops in the direction of movement of said carrier means, fixed guide means disposed between the lines of travel of the carton side flaps for moving the front and rear carton flaps to substantially horizontal positions and for simultaneously straightening the sides of the elongated liner tops to substantially vertical position and bringing the inner surfaces thereof closely adjacent one another, means fixed in the path of movement of said liner tops and also disposed between the lines of travel of the carton side flaps for creasing the vertical elongated portions of said liners, and means for folding said creased vertical portions.

10. In a machine for closing and folding the inner liners of lined cartons, the combination of carrier means for advancing the cartons through the machine, means for elongating the liner tops in the direction of movement of said carrier means, and fixed guide means disposed between the lines of travel of the carton side flaps for straightening the sides of the elongated liner tops to substantially vertical position and for bringing the inner surfaces thereof closely adjacent one another preparatory to the closing and folding thereof.

11. In a machine for closing and folding the inner liners of lined cartons, the combination of carrier means for advancing the cartons through the machine, means for elongating the liner tops in the direction of movement of said carrier means, and fixed guide means disposed between the lines of travel of the carton side flaps for moving the front and rear carton flaps to substantially horizontal positions and for simultaneously straightening the sides of the elongated liner tops to substantially vertical position and bringing the inner surfaces thereof closely adjacent one another preparatory to the closing and folding thereof.

12. In a machine for closing and folding the inner liners of lined cartons, the combination of carrier means for advancing the cartons through the machine, means for elongating the liner tops in the direction of movement of said carrier means, means for straightening the sides of the elongated liner tops and bringing the inner surfaces thereof closely adjacent one another to provide each of them with a substantially flat vertical portion, means for folding said vertical portion over upon itself through an angle of substantially 180°, means for creasing said first fold, additional means for folding said once folded liner top over upon itself through another angle of substantially 180°, additional means for creasing said second fold, and means for flattening said twice folded liner tops to substantially the level of the score lines of the carton flaps.

13. In a machine for closing and folding the inner liners of lined cartons, the combination of carrier means for advancing the cartons through the machine, means for elongating the liner tops in the direction of movement of said carrier means, means for straightening the sides of the elongated liner tops and bringing the inner surfaces thereof closely adjacent one another to provide each of them with a substantially flat vertical portion, means for folding said vertical portion over upon itself through an angle of substantially 180°, a pair of creasing rolls between which said folded liner top is moved for creasing said first fold, additional means for folding said once folded liner top over upon itself through another angle of substantially 180°, a second pair of creasing rolls for creasing said second fold, and means for flattening said twice folded liner top to substantially the level of the score lines of the carton flaps.

14. In a machine for closing and folding the inner liners of lined cartons, the combination of carrier means for advancing the cartons through the machine, means for elongating the liner tops in the direction of movement of said carrier means, means for straightening the sides of the elongated liner tops and bringing the inner surfaces thereof closely adjacent one another to provide each of them with a substantially flat vertical portion, a set of fixed folder members for folding said vertical portion over upon itself through an angle of substantially 180°, a pair of creasing rolls between which said folded liner top is moved for creasing said first fold, a second set of fixed folder members for folding said once folded liner top over upon itself through another angle of substantially 180°, a second pair of creasing rolls for creasing said second fold, and means for flattening said twice folded liner top to substantially the level of the score line of the carton flaps.

15. In a machine for closing and folding the inner liners of lined cartons, the combination of carrier means for advancing the cartons through the machine, means for elongating the liner tops in the direction of movement of said carrier means, means for straightening the sides of the elongated liner tops and bringing the inner surfaces thereof closely adjacent one another to provide each of them with a substantially flat vertical portion, a plurality of sets of fixed folder members for folding said vertical portion over upon itself a plurality of times, a set of creasing rolls associated with each set of fixed folder members for creasing the fold formed thereby, and means for flattening said folded liner top to substantially the level of the score lines of the carton flaps.

16. In a machine for handling cartons having inner liners, the combination of carrier means for advancing the cartons through the machine with the carton flaps in normally vertical positions, and means disposed wholly between the planes of travel of the carton side flaps for closing and folding the liner tops preparatory to the closing and sealing of the carton flaps, said last named means being so constructed and arranged as to be operative without disturbing the normal vertical positions of said carton side flaps.

17. In a machine for closing and folding the inner liners of lined cartons, the combination of carrier means for advancing the cartons through the machine with the carton flaps in normally vertical position, means for closing and creasing said liner tops to provide each of them with a closed substantially vertical portion, means for folding said closed vertical portion over upon itself through an angle of substantially 180°, means for creasing said first fold, additional means for folding said once folded liner top over upon itself through another angle of substantially 180°, additional means for creasing said second fold, all of said means being so constructed and arranged as to be operative without moving the carton side flaps from their normal vertical position, and means for flattening said twice folded liner top to substantially the level of the score lines of the carton flaps.

18. In a machine for closing and folding the inner liners of lined cartons, the combination of carrier means for advancing the cartons through the machine, means for closing and creasing said liner tops to provide each of them with a closed substantially vertical portion, a plurality of sets of fixed folder members for folding said closed vertical portion over upon itself a plurality of times, a set of creasing rolls associated with each set of fixed folder members for creasing the fold formed thereby, all of said closing and creasing means, fixed folder members and creasing rolls being disposed between the planes of travel of the carton side flaps, and means for flattening said folded liner top to substantially the level of the score lines of the carton flaps.

19. In a machine for handling cartons having inner liners, the combination of carrier means for advancing the cartons through the machine, means for elongating the liner tops in the direction of movement of said carrier means, fixed guide means for straightening the sides of the elongated liner tops to substantially vertical position and for bringing the inner surfaces thereof closely adjacent one another, means for closing and creasing the elongated vertical portions of said liner tops, means for folding said closed and creased vertical portions over upon themselves through an angle of substantially 180°, means for creasing said first folds, additional means for folding said once folded liner tops over upon themselves through another angle of substantially 180°, additional means for creasing said second folds, and means for flattening said twice folded liner tops to substantially the level of the score lines of the carton flaps.

20. In a machine for handling cartons having inner liners, the combination of carrier means for advancing the cartons through the machine with the carton flaps in normally vertical position, means for elongating the liner tops in the direction of movement of said carrier means, fixed guide means for straightening the sides of the elongated liner tops to substantially vertical position and for bringing the inner surfaces thereof closely adjacent one another, means for closing and creasing the elongated vertical portions of said liner tops, means for folding said closed and creased vertical portions over upon themselves through an angle of substantially 180°, means for creasing said first folds, additional means for folding said once folded liner tops over upon themselves through another angle of substantially 180°, additional means for creasing said second folds, all of said means being so constructed and arranged as to be operative without moving the carton side flaps from their normal vertical position, and means for flattening said twice folded liner tops to substantially the level of the score lines of the carton flaps.

21. In a machine for handling cartons having inner liners, the combination of carrier means for advancing the cartons through the machine, means for elongating the liner tops in the direction of movement of said carrier means, fixed guide means for moving the front and rear carton flaps to substantially horizontal positions and for simultaneously straightening the sides of the elongated liner tops to substantially vertical position and bringing the inner surfaces thereof closely adjacent one another, means for closing and creasing the vertical elongated portions of said liner tops, means for folding said closed and creased vertical portions over upon themselves through an angle of substantially 180°, means for creasing said first folds, additional means for folding said once folded liner tops over upon themselves through another angle of substantially 180°, additional means for creasing said second folds, and means for flattening said twice folded liner tops to substantially the level of the score lines of the carton flaps.

22. In a machine for handling cartons having inner liners, the combination of carrier means for advancing the cartons through the machine with the carton flaps in normally vertical position, mean for elongating the liner tops in the direction of movement of said carrier means, fixed guide means for moving the front and rear carton flaps to substantially horizontal positions and for simultaneously straightening the sides of the elongated liner tops to substantially vertical position and bringing the inner surfaces thereof closely adjacent one another, means for closing and creasing the vertical elongated portions of said liner tops, means for folding said closed and creased vertical portions over upon themselves through an angle of substantially 180°, means for creasing said first folds, additional means for folding said once folded liner tops over upon themselves through another angle of substantially 180°, additional means for creasing said second folds, all of said means being so constructed and arranged as to be operative without moving the carton side flaps from their normal vertical position, and means for flattening said twice folded liner tops to substantially the level of the score lines of the carton flaps.

23. In a machine for handling cartons having inner liners, the combination of carrier means for advancing the cartons through the machine with the carton flaps in normally vertical positions, means disposed between the planes of travel of the carton side flaps for closing and folding the liner tops preparatory to the closing and sealing of the carton flaps and without disturbing the normal vertical positions of said carton side flaps, means for moving said carton side flaps to substantially horizontal positions after said folding of the liner tops and for retaining said flaps in said position during the flattening of said folded liner tops to substantially the level of the score lines of the carton flaps and the folding of the front and rear carton flaps inwardly on top of said folded liner tops, and means for lifting said carton side flaps into contact with adhesive applying means preparatory to the closing and sealing thereof.

24. In a machine for closing and folding the inner liners of lined cartons, the combination of carrier means for advancing the cartons through the machine, means for elongating the liner tops in the direction of movement of said carrier means, and means for removing any bow in the forward panels of said cartons which may exist after the operation of said liner elongating means.

25. In a machine for closing and folding the inner liners of lined cartons, the combination of carrier means for advancing the cartons through the machine, means for elongating the liner tops in the direction of movement of said carrier means, and means mounted adjacent the path of travel of said cartons for striking the front panels thereof to remove any bow therein which may exist after the operation of said liner elongating means.

26. In a machine for closing and folding the inner liners of lined cartons, the combination of carrier means for advancing the cartons through the machine, means for elongating the liner tops in the direction of movement of said carrier means, and a spring pressed finger mounted adjacent the path of travel of said cartons for striking the front panels thereof to remove any bow therein which may exist after the operation of said liner elongating means.

27. In a machine for closing and folding the inner liners of lined cartons, the combination of carrier means for advancing the cartons through the machine, means for elongating the liner tops in the direction of movement of said carrier means, and means mounted adjacent the path of travel of said cartons for striking the front panels thereof to remove any bow therein which may exist after the operation of said liner elongating means, said means comprising a pivotally mounted finger normally positioned in the path of said forward panels and spring means associated with said finger permitting movement thereof out of said normal position when engaged by a moving carton but urging said finger to return to normal position and strike the forward panel of the next succeeding carton advanced by said carrier means.

28. In a machine for handling cartons having inner liners, the combination of carrier means for advancing the cartons through the machine, means for elongating the liner tops in the direction of movement of said carrier means, fixed guide means for straightening the sides of the elongated liner tops to substantially vertical position and for bringing the inner surfaces thereof closely adjacent one another, and means for folding the elongated and straightened vertical portions of said liner tops.

29. In a machine for handling cartons having inner liners, the combination of carrier means for advancing the cartons through the machine, means for elongating the liner tops in the direction of movement of said carrier means, fixed guide means for moving the front and rear carton flaps to substantially horizontal positions and for simultaneously straightening the sides of the elongated liner tops to substantially vertical position and bringing the inner surfaces thereof closely adjacent one another, and means for folding the elongated and straightened vertical portions of said liner tops.

CHARLES F. RICHARD.